H. JENNINGS.
TIRE PUMP DRIVING MECHANISM.
APPLICATION FILED APR. 30, 1917.
1,356,451.
Patented Oct. 19, 1920.
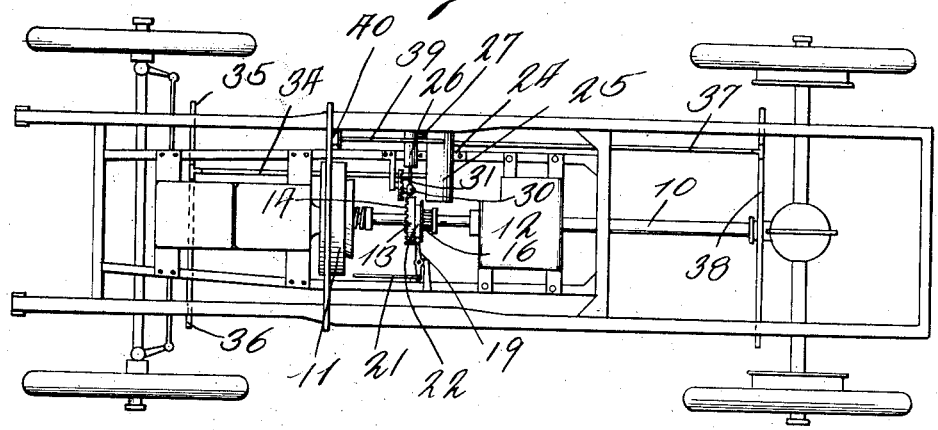
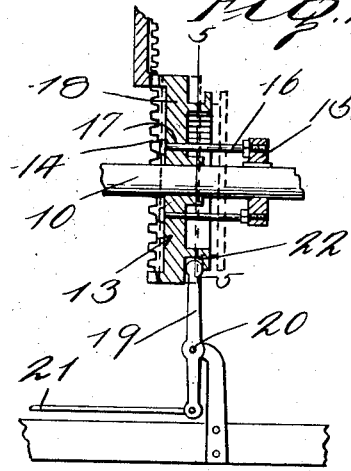
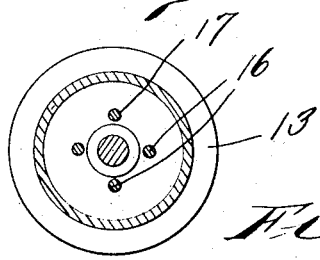
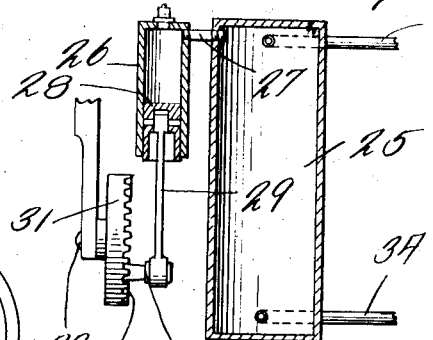
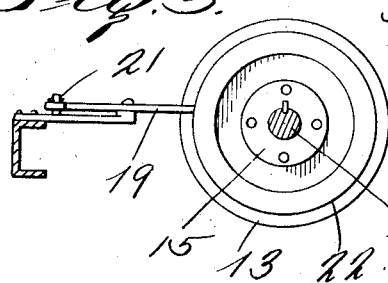
Inventor
H. Jennings

UNITED STATES PATENT OFFICE.

HENRY JENNINGS, OF EUREKA, ILLINOIS.

TIRE-PUMP-DRIVING MECHANISM.

1,356,451.   Specification of Letters Patent.   Patented Oct. 19, 1920.

Application filed April 30, 1917. Serial No. 165,499.

*To all whom it may concern:*

Be it known that I, HENRY JENNINGS, a citizen of the United States, residing at Eureka, in the county of Woodford, State of Illinois, have invented certain new and useful Improvements in Tire-Pump-Driving Mechanism; and I do hereby declare the following to be a full, clear, and exact description of the invention, such as will enable others skilled in the art to which it appertains to make and use the same.

This invention relates to new and useful improvements in power operated pumps, and pertains more particularly to air pumps adapted to be operated by the power shaft of a motor vehicle for supplying air for the inflation of tires or other purposes.

A further object of the invention is to provide means by which the pump may be inoperatively and operatively associated with the power shaft of a motor vehicle.

Referring to the drawings,

Figure 1, is a top plan view of the device.

Fig. 2, is a detail view of the driving gear and its method of operation,

Fig. 3, is an end view of the operating mechanism,

Fig. 4, is a detail view of the pump and reservoir, and,

Fig. 5, is a detail sectional view on the line 5—5 of Fig. 2.

Referring more particularly to the drawings, the reference character 10 designates the power shaft of a motor vehicle, and suitably mounted on said shaft between the clutch 11 and the transmission housing 12 is a gear wheel 13 which is provided on one of its faces with a circular series of gear teeth 14. Secured to the shaft 10 and keyed therto is a collar 15 from one side of which projects a plurality of rods or like members 16 which are adapted to pass through openings 17 in the web 18 of the gear wheel 13. The gear wheel 13 is slidably mounted on these members 16 and is adapted to be moved thereon by means of a lever 19 which is pivoted as at 20 to the frame of the motor vehicle in any suitable manner, and from which extends an operating lever 21 which is connected to a suitable foot pedal adjacent the driver's seat. The gear member 13 is provided on its face adjacent the collar 15 with a circular channel 22 into which the end 25 of the lever 19 projects in such a manner that as the lever 19 is rocked on its pivot 20 the gear 13 will be moved longitudinally of the shaft 10 and the rods or members 16. Suitably secured to the frame as by means of a bracket 24 is an air reservoir 25 and suitably supported adjacent the air reservoir 25 is a pumping cylinder 26 which is in communication with said reservoir by means of a pipe 27. A piston 28 is mounted for reciprocating movement in the cylinder 26, and secured to said piston is a piston rod 29 the outer end of which is pivotally secured as at 30 to a gear wheel 31 which in turn is mounted on a shaft 32 suitably journaled in the frame of the motor vehicle. This gear wheel 31 is provided on its outer face with a circular series of rack teeth 33 which are adapted to mesh with the circular series of gear teeth 14 on the gear wheel 13 when the same is moved to the full line position shown in Fig. 2, and it is to be understood that the pivotal connection of the piston rod 29 is near enough to the center of the gear wheel 31 to permit of its passage past the periphery of the gear 13 during the rotation of the gear 31. Extending from one end of the air reservoir 25 is a pipe 34, and branching from this pipe are pipes 35 and 36 which lead to a position on the motor vehicle adjacent two of the wheels thereof, and leading from the other end of the reservoir 25 are pipes 37 and 38 which lead to positions on the motor vehicle frame adjacent the other two wheels thereof. A pipe 39 extends from the air reservoir 25 to the instrument board of the motor vehicle at which point it carries a suitable gage or indicator 40 by which the pressure of air in the reservoir 25 is indicated.

In operation the gear 13 is moved longitudinally of the shaft 10 until its circular gear teeth 14 engage the circular gear teeth 33 of the gear 31, whereupon said gear 31 is rotated. Upon rotation of the gear 13 the piston 28 is reciprocated thus forcing air into the air reservoir 25 from which it may be piped to various parts of the machine for inflating the tires or other purposes. When the desired pressure has been reached it is indicated by the gage 40, the gears 13 and 31 are disconnected thus rendering the pump inoperative.

Having thus described the invention, what is claimed, is:

The combination with a gear to be driven, of a power shaft, a collar fixed to said shaft, rods adjustably carried by said collar, a second gear slidable on said rods and power shaft for engagement or disengagement with respect to the first gear, means for adjusting said rods and holding the same in adjusted position to vary the throw of the second gear, and lever operated means associated with the second gear for shifting the same.

In testimony whereof I affix my signature in the presence of two witnesses.

HENRY JENNINGS.

Witnesses:
CARA GRESHAM,
Mrs. CARA GRESHAM.